US011194629B2

(12) United States Patent
Bonagiri et al.

(10) Patent No.: US 11,194,629 B2
(45) Date of Patent: Dec. 7, 2021

(54) HANDLING EXPIRATION OF RESOURCES ALLOCATED BY A RESOURCE MANAGER RUNNING A DATA INTEGRATION JOB

(71) Applicant: INTERNATIONAL BUSINESS MACHINES CORPORATION, Armonk, NY (US)

(72) Inventors: Krishna Kishore Bonagiri, Ambajipet (IN); Eric Allen Jacobson, Arlington, MA (US); Ritesh Kumar Gupta, Hyderabad (IN); Indrani Ghatare, San Jose, CA (US); Scott Louis Brokaw, Groton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 16/211,534

(22) Filed: Dec. 6, 2018

(65) Prior Publication Data

US 2020/0183751 A1 Jun. 11, 2020

(51) Int. Cl.
*G06F 9/50* (2006.01)
*G06F 9/48* (2006.01)
*H04L 29/08* (2006.01)

(52) U.S. Cl.
CPC .......... *G06F 9/5055* (2013.01); *G06F 9/4881* (2013.01); *H04L 67/10* (2013.01)

(58) Field of Classification Search
CPC ....... G06F 9/5055; G06F 9/4881; H04L 67/10
See application file for complete search history.

(56) References Cited

U.S. PATENT DOCUMENTS 5,276,879 A * 1/1994 Barry .................... G06F 9/4486
718/106
9,086,902 B2 7/2015 Konik
(Continued)

OTHER PUBLICATIONS

Murthy, "Apache Hadoop YARN—Concepts and Applications," https://hortonworks.com/blog/apache-hadoop-yarn-concepts-and-applications/, Aug. 15, 2012, 6 pages.
(Continued)

*Primary Examiner* — Sisley N Kim
(74) *Attorney, Agent, or Firm* — William Hartwell; Andrew D. Wright; Roberts Calderon Safran & Cole, P.C.

(57) ABSTRACT

A method includes: receiving, by a computer device, resource request for a data integration job, wherein the resource request is received from a job executor module and defines processes of the data integration job; allocating, by the computer device, containers for the processes of the data integration job; launching, by the computer device, a respective wrapper script on each respective one of the containers after allocating the respective one of the containers; and transmitting, by the computer device and in response to the allocating, node details to the job executor module. In embodiments, the wrapper script running on the container is configured to repeatedly check a predefined location for process commands from a job executor. After the resource manager allocates all the containers for a data integration job according to a resource request, the job executor writes the process commands to the predefined location. Each wrapper script continues to check the predefined location for the process command that it is assigned to run, and runs the process command as soon as it is available at the predefined location. The process commands may be indexed with index values matching those assigned to respective ones of the wrapper scripts.

16 Claims, 4 Drawing Sheets

(56) References Cited

U.S. PATENT DOCUMENTS

| | | | |
|---|---|---|---|
| 9,787,761 | B2 | 10/2017 | Bonagiri |
| 9,917,888 | B1* | 3/2018 | Bonagiri ............... G06F 16/254 |
| 2003/0018696 | A1* | 1/2003 | Sanchez, II ............ H04L 67/10 |
| | | | 709/201 |
| 2007/0150479 | A1* | 6/2007 | Issa ....................... G06F 16/284 |
| 2015/0023161 | A1* | 1/2015 | Alisawi ............... H04L 67/2833 |
| | | | 370/230 |
| 2015/0120928 | A1 | 4/2015 | Gummaraju |
| 2016/0072726 | A1* | 3/2016 | Soni .................... H04L 41/0896 |
| | | | 709/208 |
| 2016/0094415 | A1* | 3/2016 | Bonagiri ............... G06F 9/5066 |
| | | | 709/226 |
| 2017/0235608 | A1 | 8/2017 | Zhuang |

OTHER PUBLICATIONS

Murthy, "Apache Hadoop YARN—Background and an Overview," https://hortonworks.com/blog/apache-hadoop-yarn-background-and-an-overview/, Aug. 7, 2012, 6 pages.

Saha, "Philosophy behind YARN Resource Management," https://hortonworks.com/blog/philosophy-behind-yarn-resource-management/, Feb. 22, 2013, 2 pages.

Vavilapalli, "Apache Hadoop YARN—ResourceManager," https://hortonworks.com/blog/apache-hadoop-yarn-resourcemanager/, Aug. 31, 2012, 5 pages.

Vavilapalli, "Apache Hadoop YARN—NodeManager," https://hortonworks.com/blog/apache-hadoop-yarn-nodemanager/, Sep. 11, 2012, 5 pages.

Chiang, "Untangling Apache Hadoop YARN, Part 1: Cluster and YARN Basics," http://blog.cloudera.com/blog/2015/09/untangling-apache-hadoop-yarn-part-1/, Sep. 4, 2015, 11 pages.

* cited by examiner

HANDLING EXPIRATION OF RESOURCES ALLOCATED BY A RESOURCE MANAGER RUNNING A DATA INTEGRATION JOB

BACKGROUND

The present invention relates generally to data integration jobs and, more particularly, to handling expiration of resources allocated by a resource manager running a data integration job.

Data integration (DI) jobs extract data from different sources, transform it, and push the transformed data into a target. This is commonly referred to as an Extract, Transform and Load ("ETL") job. A data integration job is typically run as a set of different processes that run in parallel, each doing one of the tasks of extraction, transformation, or loading to a target, communicating with each other through out their life-cycle. The processes of a data integration job can run on different machines that communicate with each other using TCP/IP. The processes are generally run on clusters shared by other applications or users and managed by a resource management tool. Such clusters are referred to as managed clusters.

SUMMARY

In a first aspect of the invention, there is a computer-implemented method including: receiving, by a computer device, resource request for a data integration job, wherein the resource request is received from a job executor module and defines processes of the data integration job; allocating, by the computer device, containers for the processes of the data integration job; launching, by the computer device, a respective wrapper script on each respective one of the containers after allocating the respective one of the containers; and transmitting, by the computer device and in response to the allocating, node details to the job executor module.

In another aspect of the invention, there is a computer program product including a computer readable storage medium having program instructions embodied therewith. The program instructions are executable by a computer device to cause the computer device to receive a job description defining a data integration job; prepare an execution plan based on the job description; send a resource request to a resource manager module based on the execution plan, wherein the resource specifies processes of the data integration job and a predefined location; in response to sending the resource request, receive node names associated with containers for the processes of the data integration job; prepare and send process commands to the predefined location; and receive an indication of completion of the processes.

In another aspect of the invention, there is system including a processor, a computer readable memory, and a computer readable storage medium. The system includes: program instructions to receive a resource request for a data integration job, wherein the resource request is received from a job executor module and defines processes of the data integration job; program instructions to allocate containers for the processes of the data integration job; program instructions to launch a respective wrapper script on each respective one of the containers after allocating the respective one of the containers; and program instructions to transmit, in response to the allocating, node details to the job executor module, The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
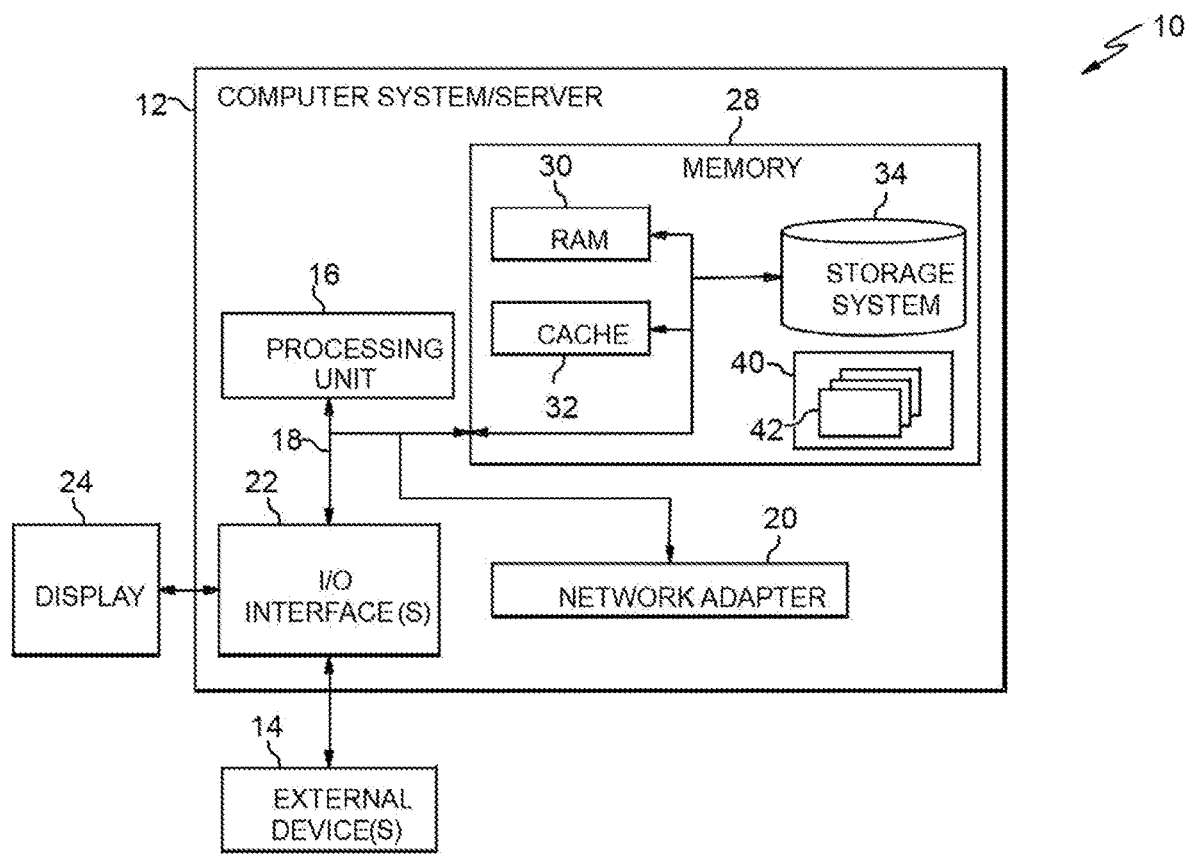
FIG. 1 depicts a computer infrastructure according to an embodiment of the present invention.

The present invention relates generally to data integration jobs and, more particularly, to handling expiration of resources allocated by a resource manager running a data integration job. Aspects of the invention address the problem of expired containers in data integration jobs by automatically running a wrapper script (e.g., wrapper program) on each container immediately after the container is allocated by a resource manager. In embodiments, the wrapper script running on the container is configured to repeatedly check a predefined location for process commands from a job executor. In embodiments, after the resource manager allocates all the containers for a data integration job according to a resource request, the job executor writes the process commands to the predefined location that each of the wrapper scripts can read from. In aspects, each wrapper script continues to check the predefined location for the process command that it is assigned to run, and runs the process command as soon as it is available at the predefined location.

According to aspects of the invention, the job executor prepares the different process commands for the different processes after all the containers are allocated by the resource manager. In embodiments, the job executor writes all the process commands for all the allocated containers to the predefined location at the same time, which results in all of the different processes being started by their respective wrapper scripts at roughly the same time (e.g., within milliseconds or seconds of one another).

According to aspects of the invention, the predefined location is a file or a socket. In embodiments, when the predefined location is a file and all of the process commands are written to the same file, the process commands are indexed with index values matching those assigned to respective ones of the wrapper scripts. In this manner, each respective wrapper script uses its index to identify its process command from the file that contains plural different process commands.

Aspects of the invention improve the technical field of data integration by providing a technical solution to the technical problem of containers that expire during data integration jobs. Implementations of the invention change the way a managed cluster of computing nodes operates by running a wrapper script on allocated containers in a data integration job that is run on the nodes of the managed cluster. Embodiments of the invention employ an unconventional arrangement of steps including: receiving, by a computer device, resource request for a data integration job, wherein the resource request is received from a job executor module and defines processes of the data integration job; allocating, by the computer device, containers for the processes of the data integration job; launching, by the computer device, a respective wrapper script on each respective one of the containers after allocating the respective one of the containers; and transmitting, by the computer device and in response to the allocating, node details to the job executor module. The steps themselves are unconventional, and the combination of the steps is also unconventional.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
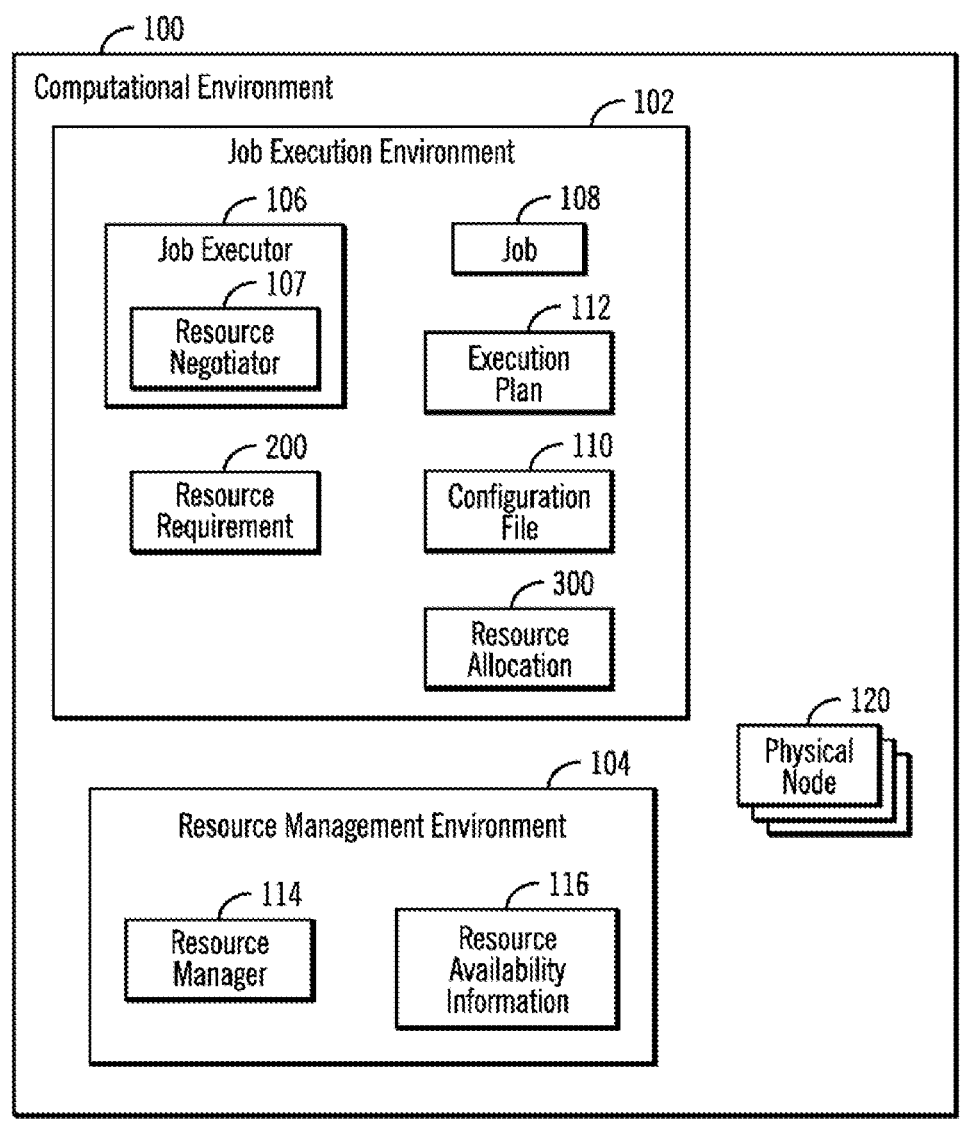
FIG. 2 shows a block diagram of an exemplary environment in which embodiments of the invention are implemented.

FIG. 2 shows a block diagram of an exemplary computational environment 100 in which embodiments of the invention are implemented. In particular, FIG. 2 illustrates an embodiment of a computational environment 100 having a job execution environment 102 and a resource management environment 104. The job execution environment 102 includes a job executor 106 that processes a job 108, such as an application or program, e.g., an Extract Transform and Load ("ETL") program, to determine the processes and flow of the job 108. In embodiments, the job executor 106 processes a configuration file template 110 specifying requested section leader nodes to be assigned to the processes of the job 108. The job executor 106 processes a job description of the job 108 to generate an execution plan 112 indicating processes to execute on the requested section leader nodes designated in the configuration file template 110.

In one embodiment, the execution plan 112 specifies various processes that execute in parallel to perform different operations of the job 108, including section leaders and players. A section leader creates and manages player processors which perform the actual job 108 execution. The section leaders also manage communication among the player processes and the conductor process. The players comprise one or more logical groups of processes used to execute the data flow logic. All players are created and may execute on a same physical node as the section leader. A conductor is a main process that starts the job 108, determines resource requirements, assigns players to nodes, creates the section leader processes, and acts as a single coordinator for status and error messages.

In embodiments, the job executor 106 includes a resource negotiator 107 to request actual physical nodes 120 with sufficient resources on which to execute the determined processes in the execution plan 112, e.g., section leaders and players, from a resource manager 114, where in the execution plan 112, the processes are designated to operate on requested section leader nodes for which there is not yet an allocated physical node 120. In order to request physical nodes that meet the job resource requirement from the resource manager 114, the job executor 106 may construct a resource requirement 200 having information on the processes (e.g., section leaders and players) required by the job 108, which is processed by a resource negotiator 107 to determine how to allocate physical nodes to the processes in the execution plan 112. Once determining an allocation, the resource negotiator 107 requests the specific physical node allocation 120 from the resource manager 114.

The resource management environment 104 includes the resource manager 114 and resource availability information 116 having information on a remaining or current availability of resources in the physical nodes 120. The resource manager 114 provides the resource negotiator 107 the resource availability information 116, which the resource negotiator 107 uses to determine the physical nodes having sufficient available resources to allocate to the processes in the execution plan 112. The resource manager 114 then performs the allocation as requested by the resource negotiator 107.

In response to the resource requirement 200, the resource negotiator 107 determines the allocation of physical nodes 120 to processes in the execution plan 112, requests the resource manager 114 to implement the determined allocation, and then generates manager a resource allocation 300 having the determined allocation of physical nodes to processes to return to the job executor 106 to use to update the execution plan 112 to reflect the actual assigned physical nodes.

The computational environment 100 thus described allows for running of parallel processes of a job on a dynamically allocated set of nodes by preparing the execution plan with dummy node names or placeholders and then replacing the dummy node names with the actual node names. In this way, the physical nodes are allocated after the execution plan is generated.

The computational environment 100 in which the job execution environment 102 and resource management environment 104 are implemented may comprise one or more servers. If multiple servers are used to implement the computational environment 100, then the servers may communicate over a network, such as a Storage Area Network (SAN), Local Area Network (LAN), Intranet, the Internet, Wide Area Network (WAN), peer-to-peer network, wireless network, arbitrated loop network, etc. The environment may include storage resources comprising one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices in which the storage resources are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The physical nodes 120 may each comprise a separate computing resource, such as a physical server or computer having an operating system to independently execute processes, such as a conductor, section leader, and players. In further embodiments, the physical nodes 120 may comprise a virtual machine providing a virtualization of an independent system. The physical nodes 120 may comprise a mixture of dedicated systems and virtual machines.

In embodiments, the job executor 106 and the resource manager 114 each comprise one or more program modules, such as program modules 42 described with respect to FIG. 1. The computational environment 100 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
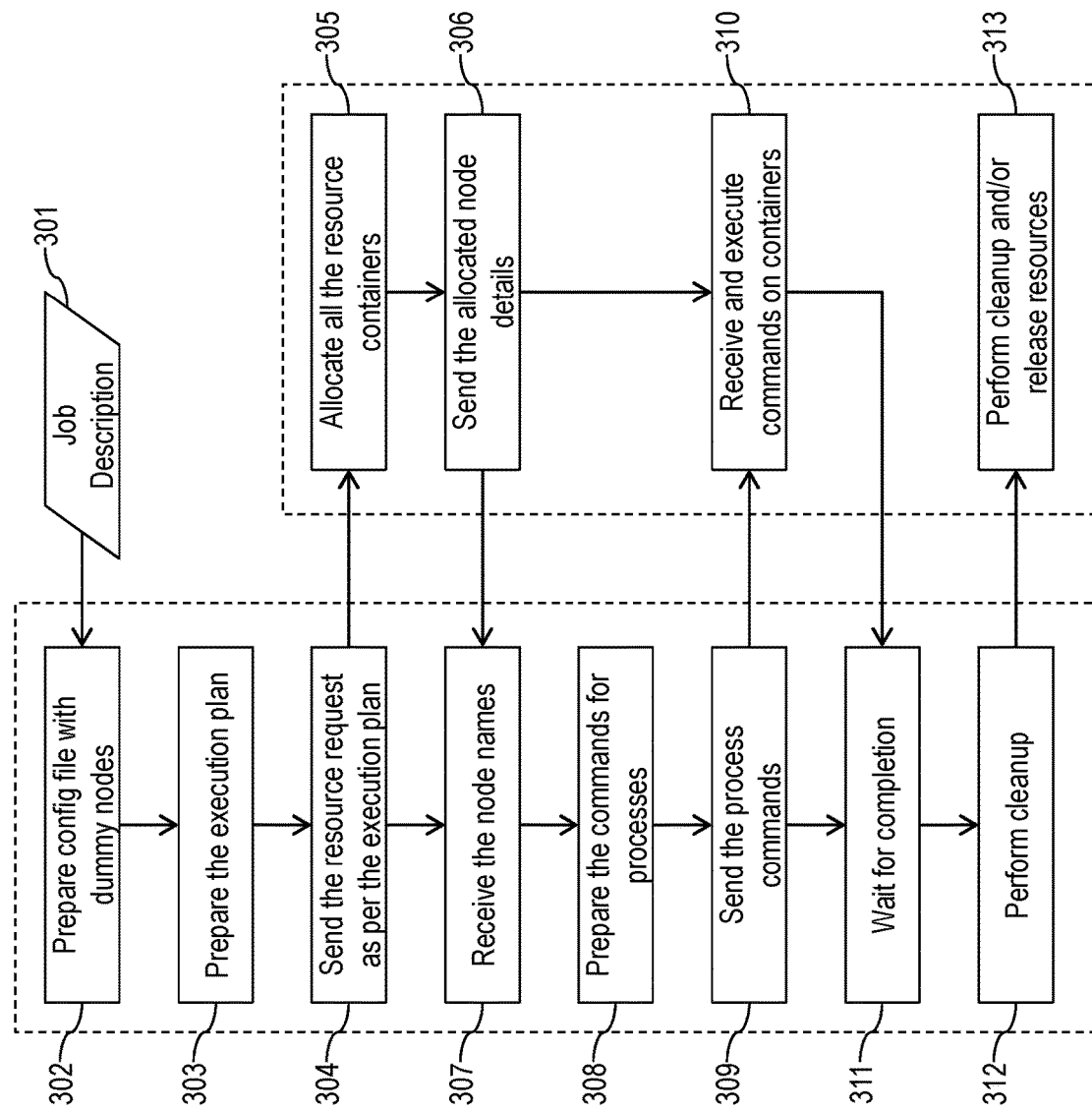
FIG. 3 shows a flowchart of an exemplary data integration job.

FIG. 3 shows a flowchart of an exemplary data integration job. At step 301, a user inputs a job description to a job executor, which corresponds to the job executor 106 of FIG. 2. At step 302, based on the job description, the job executor prepares a configuration file with dummy nodes. At step 303, the job executor generates an execution plan based on the job description and the configuration file. The execution plan defines the processes to be run for the job, which nodes each process should be run on, and what functions each process should perform. At step 304, the job executor sends a resource request to the resource manager, which corresponds to the resource manager 114 of FIG. 2.

At step 305, the resource manager allocates resource containers based on the resource request. In aspects, each container corresponds to a single process defined in the execution plan, such that there is a one to one correspondence between processes and containers. In practice, the resource manager manages a large set of resources in a cluster, e.g., at nodes 120 of FIG. 2, amongst plural different user and different jobs. The resource manager arbitrates the resources, called containers, among different applications and subscribing users. The resource manager allocates containers based on the requirement specification at different points in time, and may take more time to allocate some of the containers in a particular job depending on the resources on the machine they are requested on. Since the resource manager allocates resources amongst different applications, the resource manager expires allocated containers in cases where the application does not start using the container within a predefined amount of time after allocation of the container. In this manner, the shared resources are freed up for use by other applications.

For example, a particular data integration job often runs as multiple different processes on the same or different machines corresponding to nodes 120 in FIG. 2. In an exemplary use case, the data integration job defined by the job description might be run as four processes P1, P2, P3, and P4. In such an example, four containers C1, C2, C3, and C4 will be allocated in the managed cluster for running the four processes P1-4. In this scenario, each of the container allocation requests will have a resource requirement specification, and each of the four processes P1-4 might require different sizes of combinations of resources depending the respective task each process is performing. In this example, step 305 comprises allocating C1 for P1, allocating C2 for P2, allocating C3 for P3, and allocating C4 for P4. Later in the process, P1 will be launched on C1, P2 on C2, P3 on C3, and P4 on C4, with each of the processes being launched on its own container because the different containers are allocated as per the requirements of the different corresponding processes.

With continued reference to FIG. 3, at step 306 the resource manager sends the allocated node details to the job executor. At step 307, the job executor receives the node names assigned by the resource manager. At step 308, the job executor prepares commands for each of the job processes (e.g., processes P1-4 in this example). Process commands include, for example, commands on how to start the process, an executable to be run by the process, inputs of the executable, and the node name allocated by the resource manager that the process will run on. At step 309, the job executor sends the process commands to the resource manager. At step 310, the resource manager receives the process commands and executes the commands on the allocated containers, e.g., executes the data integration process commands inside the containers allocated by the resource manager. Step 310 comprises execution of the processes at the physical nodes in the managed cluster.

After step 310, the resource manager reports completion of the processes to the job executor. Completion includes success or failure of each process. At step 311 the job executor waits for and receives the report of completion. At step 312 the job executor performs cleanup, and at step 313 the resource manager performs cleanup and/or releases resources used during the data integration job.

Still referring to FIG. 3, at step 304 the job executor sends the resource request for all the container allocations at a same time. Also, at step 309 the job executor sends the process commands for all the containers at a same time. Step 309 includes sending all the process commands at a same time because at step 308 the commands to run the processes on the containers can be prepared only after all the containers are allocated, due to the fact that this command generation depends on the names of the nodes on which the containers are actually allocated. However, at step 305 the resource manager does not always allocate all the requested containers at a same time. This is because the resource manager allocates each container when the requested resource is available. For example, the resource manager might allocate a first container (e.g., C1) immediately upon receiving the resource request due to the resource for this container being currently available, and the resource manager might wait to allocate a second container (e.g., C2) due to the resource for this container currently being in use by another application and not yet available for this job. In this example, C1 is allocated but is not yet in use since it has not received the process commands at step 310. Therefore, C1 is in danger of expiring if it does not receive its process command before the passing of the predefined expiration time. And since the job executor does not prepare and send the process commands (at step 308 and 309) until all containers have been allocated, it is a very real possibility that a delay in allocating a second container (e.g., C2) can result in the expiration of a first container (e.g., C1). The result of an expired container, as described in this example, is that the data integration job fails to properly execute when the job executor finally sends the process commands at step 309. This is because at least one of the data integration job processes (i.e., the process associated with the expired container) is not run at step 310 due to the expired container.

Aspects of the invention address this problem of expired containers in data integration jobs by automatically running a wrapper script (e.g., wrapper program) on each container immediately after the container is allocated by the resource manager. The wrapper script for a container causes the container to be in use, thereby avoiding the possibility that the resource manager will expire the container due to non-use, e.g., while waiting for another container to be allocated. Using the example described above, the resource manager runs a wrapper script on C1 immediately after allocating C1. In this manner, C1 is in use (e.g., via the wrapper script) even though C2 is not yet allocated (e.g., because it must wait for its resource to become available).

According to aspects of the invention, the wrapper script running on each container repeatedly checks for process commands at a predefined location. In embodiments, after the resource manager allocates all the containers and the job executor receives the node names for each of the containers, the job executor prepares the process commands for all the containers and sends (e.g., writes) the process commands to the predefined location. The process commands are thus available the next time that each of the wrapper scripts checks the predefined location. In this manner, all the containers receive their respective process commands and start at essentially the same time.

In embodiments, the predefined location is a file, such as an HDFS (Hadoop® Distributed File System) file. (Hadoop is a registered trademark of The Apache Software Foundation.) The location of the file is defined in data included in the resource request, and is provided to each respective one of the wrappers when the resource manager runs the wrapper on a container after allocating the container.

In embodiments, the predefined location is a socket, such as a TCP/IP socket. The identity of the socket is defined in data included in the resource request, and is provided to each respective one of the wrappers when the resource manager runs the wrapper on a container after allocating the container.

In embodiments, each respective wrapper script is assigned a unique index. The respective process commands sent to the predefined location each has an index corresponding to one of the indexes assigned to the respective wrapper scripts. In this manner, each wrapper script uses its unique index to determine its relevant process commands from the plural process commands that are sent to the predefined location.

Figure 4:
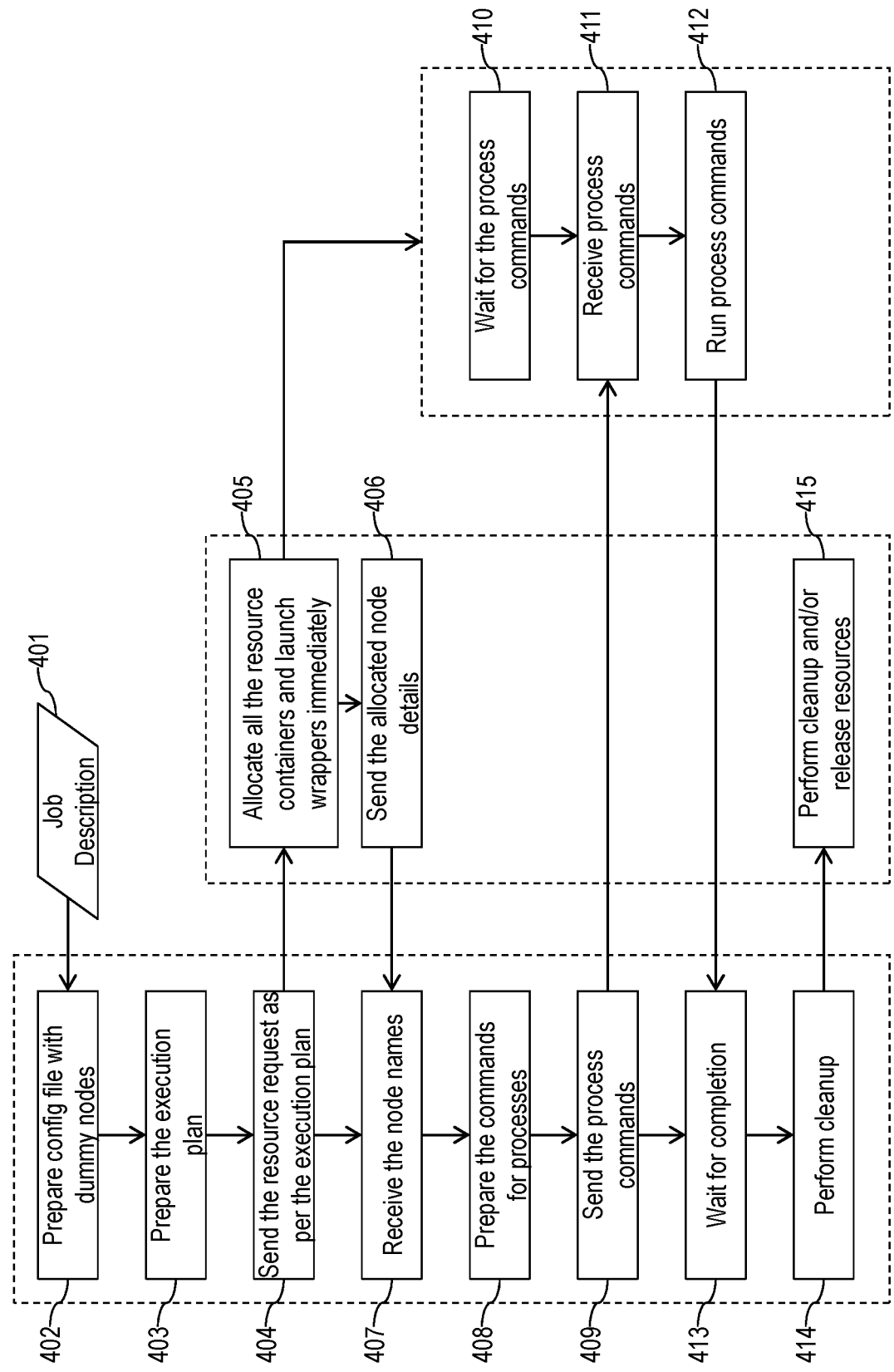
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 401, a user inputs a job description to a job executor, which corresponds to the job executor 106 of FIG. 2. At step 402, based on the job description, the job executor prepares a configuration file with dummy nodes. At step 403, the job executor generates an execution plan based on the job description and the configuration file. The execution plan defines the processes to be run for the job, which nodes each process should be run on, and what functions each process should perform. At step 404, the job executor sends a resource request to the resource manager, which corresponds to the resource manager 114 of FIG. 2. In embodiments, the resource request includes data that defines a predefined location where process commands will be sent later in the process. In embodiments, the resource request also includes a unique index for each process in the data integration job.

At step 405, the resource manager receives the resource request from the job executor and allocates containers for the data integration job according to the resource request. In embodiments, the resource manager runs a wrapper script on each container it allocates immediately after it allocates the container. As used herein, immediately refers to a time measured in milliseconds or second, such as within 10 seconds after allocating the container. The resource manager need not allocate all the requested containers at the same time. In accordance with aspects of the invention, wrapper scripts that are run by the resource manager wait for process commands as indicated at step 410. In embodiments, the resource manager provides each wrapper script with data that defines the predefined location based on the resource request. In embodiments, the resource manager assigns a respective unique identifier to each respective wrapper script based on the resource request. At step 306, after allocating all the containers for the data integration job pursuant to the resource request, the resource manager sends the allocated node details to the job executor.

With continued reference to FIG. 4, at step 407 the job executor receives the node names assigned by the resource manager. At step 408, the job executor prepares commands for each of the job processes. Process commands include, for example, commands on how to start the process, an executable to be run by the process, inputs of the executable, and the node name allocated by the resource manager that the process will run on.

At step 409, the job executor sends the process commands to the predefined location. In one embodiment, the predefined location is a file (e.g., an HDFS file) and the job executor writes the process commands to the file. In another embodiment, the predefined location is a socket (e.g., a TCP/IP socket) and the job executor writes the process commands to the socket. In both embodiments, the job executor provides a respective unique index with each of the respective process commands.

As indicated at step 410, each wrapper script waits for the process commands after being launched by the resource manager. Step 410 includes each of the wrapper scripts individually checking the predefined location for the process commands, e.g., at repeated time intervals. After the job executor sends the process commands to the predefined location at step 409, each wrapper script receives its respective process commands at step 411. As described herein, the respective wrapper scripts identify their process commands from the plural process commands by matching a unique index that is assigned to the process commands and the wrapper script.

At step 412, each container runs its respective process commands. Step 412 comprises execution of the processes of the containers, according to their respective process commands, at the physical nodes (e.g., nodes 120) of the managed cluster. At step 413 the job executor waits for and receives the report of completion. At step 414 the job executor performs cleanup, and at step 415 the resource manager performs cleanup and/or releases resources used during the data integration job.

As should be understood from the description herein, implementations of the invention may be used to provide a system and method for running data integration job commands on containers without the containers becoming expired during aspects of the job. In embodiments, the system wraps the execution of data integration job commands into a wrapper script or program. In embodiments, the system runs the wrapper script on the container as soon as the container is allocated. In embodiments, the wrapper script is configured to continue looking for the availability of the data integration job command and run them as soon as they are available. In embodiments, the system makes the data integration job commands available for the respective wrapper scripts by: writing the data integration job commands into an HDFS file that the wrapper scripts look at; and pass an index for each of the wrapper scripts executed by containers, to indicate which command in the HDFS file it has to execute.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, by a computer device, a resource request for a data integration job, wherein the resource request is received from a job executor module and defines processes of the data integration job;
    allocating, by the computer device, containers for the processes of the data integration job;
    launching, by the computer device, a respective wrapper script on each respective one of the containers after allocating the respective one of the containers; and
    transmitting, by the computer device and in response to the allocating, node details to the job executor module,
    wherein the respective wrapper scripts running on respective ones of the containers prevent the containers from being expired due to non-activity,
    the wrapper script is configured to look for process commands at a predefined location,
    the predefined location is a file, the computer device writes the process commands to the file, and the computer device indexes the process commands with index values matching index values assigned to respective ones of the wrapper scripts.

2. The method of claim 1, wherein the file is identified in the wrapper script.

3. The method of claim 1, wherein each one of the respective wrapper scripts defines a unique index that corresponds to one of plural indexes included in the process commands.

4. The method of claim 1, wherein each of the containers is configured to execute one of the processes at a physical node of a managed cluster based on the process commands.

5. The method of claim 4, wherein:
the resource request specifies dummy nodes; and
the transmitted node details identify actual nodes of the managed cluster.

6. The method of claim 1, wherein the transmitting the node details is performed after the containers have been allocated to all the processes of the data integration job.

7. The method of claim 1, wherein the computer device receives the resource request for all of the container allocations at a same time, and
the computer device prepares the process commands are after the computer device allocates all of the containers.

8. A computer program product, the computer program product comprising a computer readable storage medium having program instructions embodied therewith, the program instructions executable by a computer device to cause the computer device to:

receive a job description defining a data integration job;
prepare an execution plan based on the job description;
send a resource request to a resource manager module based on the execution plan, wherein the resource request specifies processes of the data integration job, specifies a predefined location, includes instructions to allocate containers for processing the data integration job, and includes instructions to launch a respective wrapper script on each respective one of the containers after allocating the respective one of the containers;
in response to sending the resource request, receive node names associated with the containers for the processes of the data integration job;
prepare and send process commands to the predefined location; and
receive an indication of completion of the processes,
wherein the respective wrapper scripts running on respective ones of the containers prevent the containers from being expired due to non-activity by causing the container to be in use,
the predefined location is a file,
the program instructions cause the computer device to write the process commands to the file, and
the program instructions cause the computer device to index the process commands with index values matching index values assigned to respective ones of the wrapper scripts.

9. The computer program product of claim 8, wherein:
the resource request defines a respective unique index for each respective one of the processes; and
the process commands include plural process commands each one of which includes an index that corresponds to the respective unique index for one of the processes.

10. The computer program product of claim 8, wherein:
the resource request specifies dummy nodes; and
the node names identify physical nodes of a managed cluster on which the processes are run.

11. The computer program product of claim 8, wherein the program instructions cause the computer device to wait to receive all the node names before preparing and sending the process commands.

12. A system comprising:
a processor, a computer readable memory, and a computer readable storage medium;
program instructions to receive a resource request for a data integration job, wherein the resource request is received from a job executor module and defines processes of the data integration job;
program instructions to allocate containers for the processes of the data integration job;
program instructions to launch a respective wrapper script on each respective one of the containers after allocating the respective one of the containers; and
program instructions to transmit, in response to the allocating, node details to the job executor module,
wherein the respective wrapper scripts running on respective ones of the containers prevent the containers from being expired due to non-activity by causing the container to be in use,
the wrapper scripts are configured to look for process commands at a predefined location,
the predefined location is a file,
the process commands are written to the file, and
the program instructions are stored on the computer readable storage medium for execution by the processor via the computer readable memory.

13. The system of claim 12, wherein each one of the respective wrapper scripts defines a unique index that corresponds to one of plural indexes included in the process commands.

14. The system of claim 12, wherein each of the containers is configured to execute one of the processes at a physical node of a managed cluster based on the process commands.

15. The system of claim 14, wherein:
the resource request specifies dummy nodes; and
the transmitted node details identify actual nodes of the managed cluster.

16. The system of claim 12, further comprising program instructions to index the process commands with index values matching index values assigned to respective ones of the wrapper scripts.

* * * * *